US005740138A

United States Patent [19]
Hoshino et al.

[11] Patent Number: 5,740,138
[45] Date of Patent: Apr. 14, 1998

[54] APPARATUS FOR RECORDING INFORMATION ON A PRIMARY OPTICAL DISK TO MANUFACTURE OPTICAL DISKS

[75] Inventors: Isao Hoshino; Toyoki Taguchi, both of Yokohama; Masaaki Matsumaru, Funabashi; Masahiko Tanaka, Yokohama, all of Japan

[73] Assignee: Kabushiki Kaisha Toshiba, Kawasaki, Japan

[21] Appl. No.: 523,961

[22] Filed: Sep. 6, 1995

[30] Foreign Application Priority Data

Sep. 6, 1994 [JP] Japan .................................. 6-212245
Sep. 12, 1994 [JP] Japan .................................. 6-216866

[51] Int. Cl.$^6$ .................................................. G11B 7/085
[52] U.S. Cl. .................................. 369/44.29; 369/44.38
[58] Field of Search ............................ 369/44.27, 44.38, 369/44.14, 44.35, 44.29, 44.24, 111, 112, 275.1, 275.2, 121, 44.15, 44.16, 44.37

[56] References Cited

U.S. PATENT DOCUMENTS

| | | | |
|---|---|---|---|
| 5,040,165 | 8/1991 | Taii et al. | 369/44.37 X |
| 5,295,125 | 3/1994 | Oonishi et al. | 369/44.37 X |
| 5,339,300 | 8/1994 | Akatsuka et al. | 369/44.38 X |
| 5,367,512 | 11/1994 | Satou et al. | 369/44.23 |

FOREIGN PATENT DOCUMENTS

| | | |
|---|---|---|
| 50-136051 | 10/1975 | Japan . |
| 61-296534 | 12/1986 | Japan . |

*Primary Examiner*—Thang V. Tran
*Attorney, Agent, or Firm*—Oblon, Spivak, McClelland, Maier & Neustadt, P.C.

[57] ABSTRACT

A primary optical disk recording apparatus comprises a first light source for recording a signal on a primary optical disk, an objective lens for converging a light beam from the first light source on the primary optical disk, a second light source for detecting a focus error between the objective lens and the primary optical disk, and a controller for detecting a reflection light beam from the first light source, which is reflected from the primary optical disk, while the signal is being recorded on the primary optical disk, and for subjecting a signal of the reflection beam to an arithmetic operation process, thereby detecting a first focus error signal and controlling the focus error on the basis of the first focus error signal.

14 Claims, 11 Drawing Sheets

SPECTRAL SENSITIVITY CHARACTERISTIC OF PIN SILICON PHOTODIODE

F I G. 5

SPECTRAL SENSITIVITY CHARACTERISTIC OF PHOTORESIST

FOCUS ERROR SIGNAL OUTPUT

F I G. 15A

←—— 30μm ——→

F I G. 15B

←— 2μm —→

APPARATUS FOR RECORDING INFORMATION ON A PRIMARY OPTICAL DISK TO MANUFACTURE OPTICAL DISKS

BACKGROUND OF THE INVENTION

1. Field of the Invention

The present invention relates generally to a primary optical disk recording apparatus for recording small pits on a primary optical disk, and more particularly to a primary optical disk recording apparatus capable of recording pits with high reliability.

2. Description of the Related Art

In a primary optical disk recording apparatus, a laser with short wavelength is used as a light source for exactly recording small pits, and a photoresist is used as a recording medium. If an information recording light source in a regular optical disk apparatus is used as a light source for focal error detection in a primary optical disk recording apparatus, the following problems will occur since a photoresist is a photochemical recording medium. That is, even when a weak light output is radiated on a primary optical disk, the disk is set in a recording state due to an accumulation effect. In addition, the spectral sensitivity of a photodetector for focal error detection deteriorates if the wavelength of a light output from a light source decreases. Thus, if an information recording light source in a regular optical disk apparatus is used as a light source for focal error detection in a primary optical disk recording apparatus, it is difficult to stabilize the focal control in the primary optical disk recording apparatus.

Under the circumstances, in a conventional primary optical disk recording apparatus, a light source with long wavelength is used as a light source for focal error detection, in addition to a light source for information recording.

Figure 3:
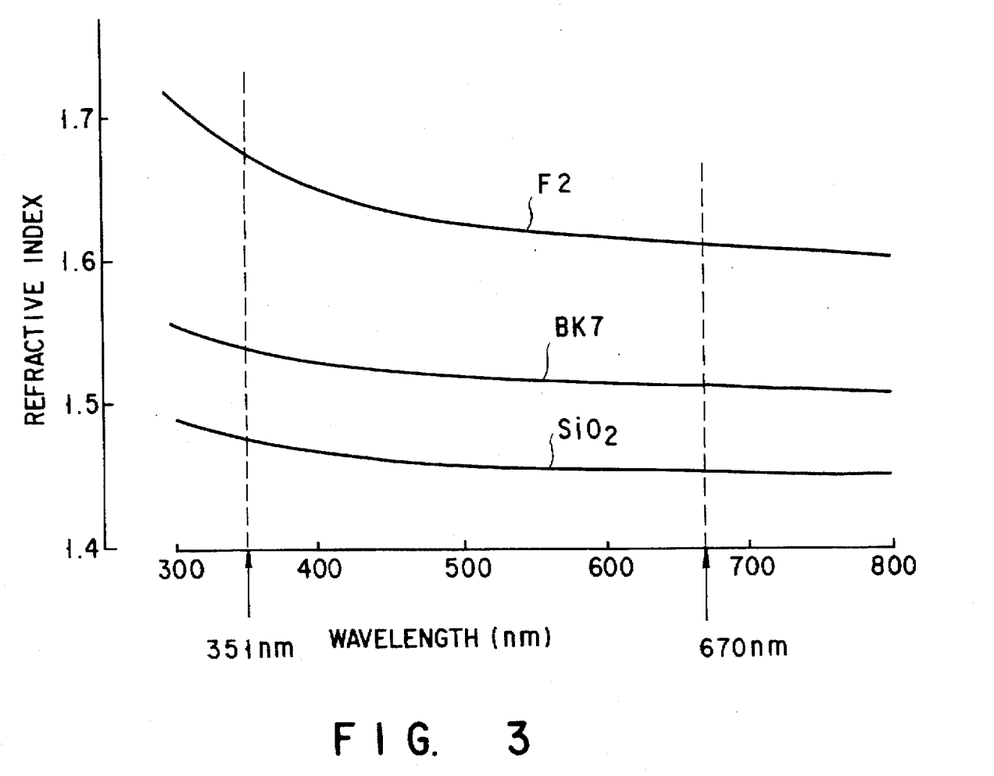
FIG. 3 is a graph showing a variation in refractive index of a glass material of the objective lens shown in FIG. 2 in relation to wavelength.

However, in the prior art, the wavelength of the light source of the primary optical disk recording apparatus needs to be decreased as the recording density of the optical disk increases, and an objective lens with special structure needs to be used. It is very difficult, therefore, to set the same focal distance for the wavelength (e.g. 351 nm) of the light source for information recording and for the wavelength (e.g. 633 nm) of the light source for focal error detection. The reason for this is that in the case of short wavelength, the refractive index of glass material of a lens increases, as shown in FIG. 3. Thus, even if a focal error is detected with a long-wavelength light source, it is unclear whether a light beam from the light source for information recording is actually focused on the primary optical disk.

In a conventional primary optical disk recording apparatus, a beam spot on the primary optical disk is projected and enlarged on a light receiving surface of a TV camera, thereby to observe a variation in beam spot size (i.e. a circle with a varying diameter).

In the prior art, however, the size of the beam spot on the primary optical disk needs to be decreased as the recording density of the optical disk increases. If the beam spot is reduced, the focal depth becomes shallower and a slight degree of defocusing affects the recording condition greatly. Since a conventional beam monitor system is so constructed as to simply observe a variation in diameter of a light beam, a slight degree of defocusing or a focal offset cannot adequately be determined.

Furthermore, in the primary optical disk recording apparatus, the weight (10 to 15 g) of an objective lens to be moved is much heavier than that (0.1 g at most) in a regular optical disk apparatus. Thus, the position of the objective lens along the optical axis is controlled by an actuator using a suspension in which unnecessary vibration is suppressed by a substantially immovable plate spring. The suspension of the actuator of this type has a fixed end at an outer peripheral portion of a concentric plate spring and a free end at an inner peripheral portion thereof to which the lens is attached. Unnecessary vibration of the plate spring is suppressed by connecting the inner and outer peripheral portions with radially extending linear rims.

The movable distance along the optical axis of the suspension of the conventional actuator, however, is very small. In addition, the damping of the plate spring at a major resonance frequency is not adequate, and the precision of the focal control system is limited.

The object of the present invention is to provide a primary optical disk recording apparatus having a suitable focus controller, a beam monitor or an actuator, thereby to achieve highly reliable pit recording.

SUMMARY OF THE INVENTION

The above object of the invention can be achieved by a primary optical disk recording apparatus comprising:

a first light source for recording a signal on a primary optical disk;

an objective lens for converging a light beam from the first light source on the primary optical disk;

a second light source for detecting a focus error between the objective lens and the primary optical disk;

first detection means for detecting a reflection light beam from the first light source which is reflected from the primary optical disk while the signal is being recorded on the primary optical disk, and for subjecting a signal of the reflection beam to an arithmetic operation process, thereby detecting a first focus error signal; and first control means for controlling the focus error on the basis of the first focus error signal detected by the first detection means.

The above object can also be achieved by a primary optical disk recording apparatus comprising:

light source for recording a signal on a primary optical disk;

an objective lens for converging a light beam from the light source on the primary optical disk; and a beam monitor system for providing an aberration to a reflection light beam from the light source, which has been reflected from the primary optical disk, and monitoring a variation in beam shape of the reflection light beam provided with the aberration, thereby to observe the focus error between the objective lens and the primary optical disk.

The above object can also be achieved by a primary optical disk recording apparatus comprising:

a light source for recording a signal on a primary optical disk;

an objective lens for converging a light beam from the light source on the primary optical disk;

an actuator for moving the objective lens along the optical axis so as to cancel a focus error between the objective lens and the primary optical disk; and a suspension, formed by sandwiching a plate spring by viscoelastic members, for supporting the objective lens movably along the optical axis.

The above object can also be achieved by a primary optical disk recording apparatus comprising:

a first light source for recording a signal on a primary optical disk;

an objective lens for converging a light beam from the first light source on the primary optical disk;

a member for driving the objective lens; and a first controller, provided on the member, for detecting a reflection light beam from the second light source, which has been reflected from the primary optical disk, while the signal is being recorded on the primary optical disk, detecting a third focus error signal by subjecting a signal of the reflection light beam to an arithmetic operation process, and controlling the focus error on the basis of the third focus error signal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Figure 1:
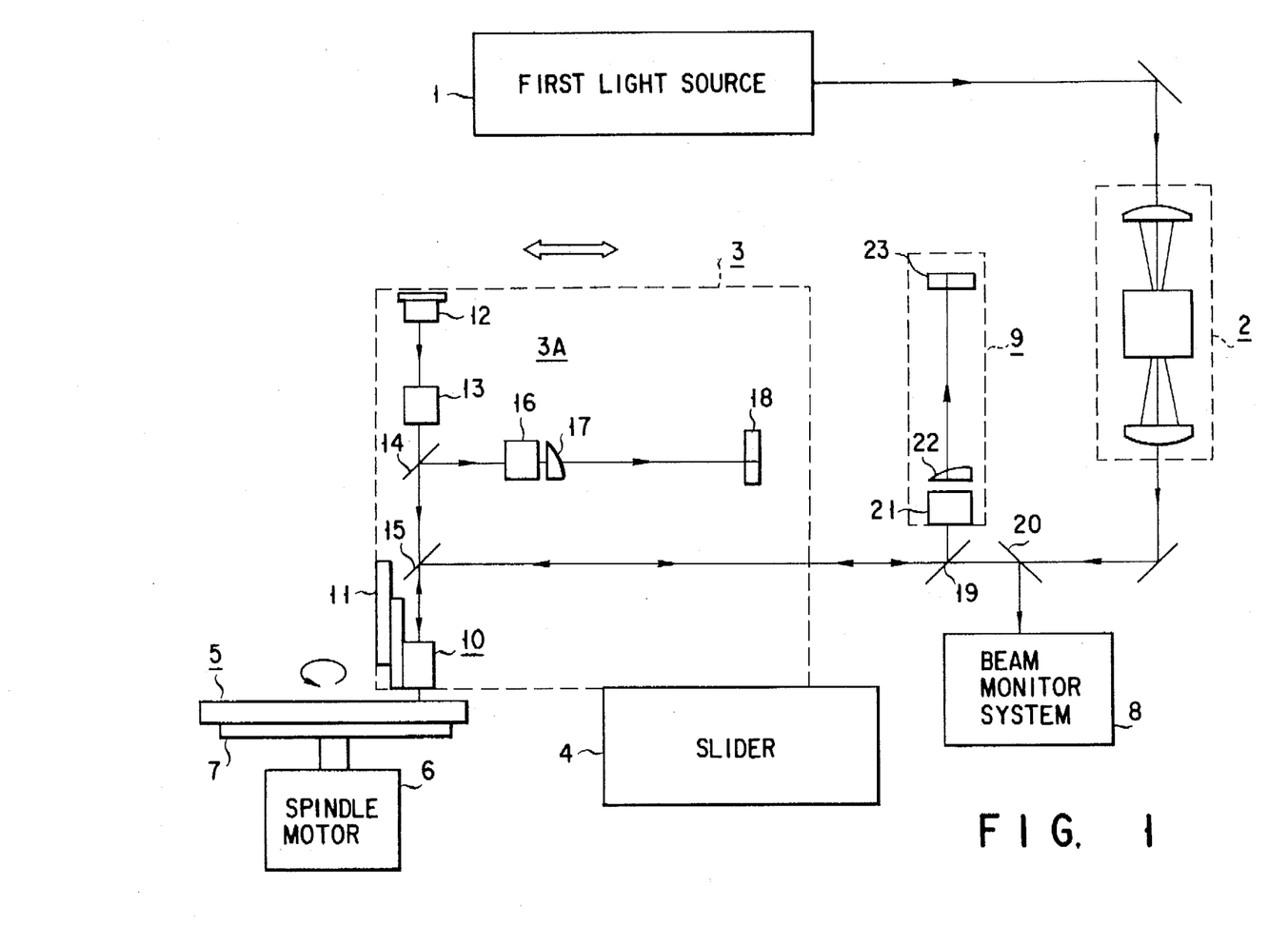
FIG. 1 schematically shows a main part of a primary optical disk recording apparatus according to an embodiment of the invention.

FIG. 1 shows a primary optical disk recording apparatus according to a preferred embodiment of the present invention. The apparatus comprises a light source (first light source) 1 for information recording; a light modulator 2; a moving optical system 3 constituted by a lens unit 10, a stage 11, a light source (second light source) 12 for emitting a long-wavelength laser beam and a first focus error detection system 9; a slider 4; a spindle motor 6; a turntable 7 for supporting a primary optical disk 5; a beam monitor system 8 including a beam splitter 20; a second focus error detection system 3A constituted by a plurality of optical elements such as a beam splitter 19, a detection lens unit 21, a shaping prism 22 and a photodetector 23; and a focus control system shown in FIG. 8 (described later).

This embodiment is characterized in that there are provided two detection systems, i.e. the first focus error detection system 3A having a light source of a light beam for information recording and the second focus error detection system 3A having a long-wavelength light source, that there is provided the beam monitor system having aberration providing means such as astigmatism providing means, and that there is provided an actuator with good vibration characteristics.

The main part of the moving optical system 3 is attached to the slider 4 and stage 11. The main part of the moving optical system 3 comprises the lens unit 10 having, e.g. objective lenses shown in FIG. 2, the light source 12 and the first focus error detection system 3A. The second focus error detection system 3A comprises a plurality of optical elements such as a collimate unit 13, a mirror 14, a dichroic mirror 15, a detection lens unit 16, a cylindrical lens 17 and a photodetector 18. FIG. 3 shows variations in refractive index of the glass material of the objective lenses shown in FIG. 2 due to wavelengths.

Figure 4:
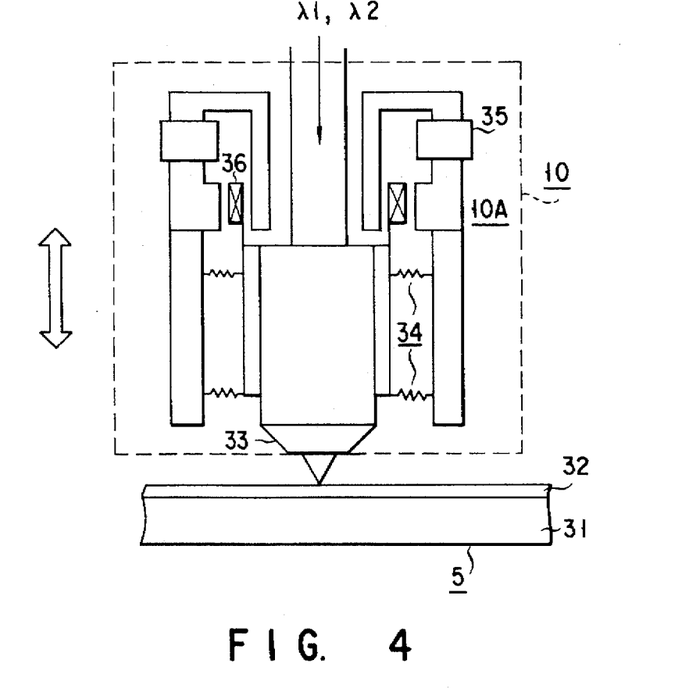
FIG. 4 schematically shows a main part of a lens unit shown in FIG. 1.

FIG. 4 shows an example of the structure of the lens unit 10. The lens unit 10 comprises at least an objective lens 33 and an actuator 10A for vertically moving an objective lens 33. The actuator 10A comprises a suspension 34, a permanent magnet 35 and a coil 36.

The light source 1 for information recording emits a laser beam of short wavelength (351 nm: ultraviolet) such as a Kr ion laser beam. The light beam emitted from the light source 1 is substantially parallel. The light modulator 2 modulates the intensity of the light beam in accordance with information to be recorded.

The light beam from the light modulator 2 reflects on a mirror and passes through a beam splitter. Then, the beam is reflected by the dichroic mirror 15 and passed through the objective lenses of the lens unit 10. Thus, a small spot (a small pit) of the beam is formed on the primary optical disk 5. The primary optical disk 5 is formed by coating a substrate with a photoresist as a recording medium. The primary optical disk 5 is mounted on the turntable 7 of the spindle motor 6 and is rotated. During information recording, the moving optical system 3 on the slider 4 is moved in the radial direction of the primary optical disk in cooperation with the rotation of the disk. Thereby, information is recorded spirally on the disk.

On the other hand, the light beam from the light source 1 reflected by the primary optical disk 5 travels through the objective lens and dichroic mirror 15 in the reverse direction and is reflected by the beam splitter 19. The reflected beam is guided to the first focus error detection system 9 and a focus error due to the positional relationship between the objective lens and the primary optical disk is detected. In FIG. 1, the focus error detection system is constructed on the basis of astigmatism.

The main feature of the present invention resides not in the detection method, but in the use of different light beams in focus error detection in accordance with the condition of the primary optical disk recording apparatus. Part of the reflection light from the primary optical disk passes through the beam splitter 19, reflects from the beam splitter 20, and reaches the beam monitor system 8. Like the first focus error detection system 9, the beam monitor system 8 is constructed on the basis of astigmatism. However, unlike the first focus error detection system 9, means for observing the beam shape, such as an ITV camera, is used instead of the photodetector 23. The aberration to be applied to the light beam incident on the beam monitor system is not limited to the astigmatism, but it may be mixed aberration as described Jap. Pat. Appln. KOKAI Publication No. 3-257 ("OPTICAL MEMORY APPARATUS").

On the other hand, a rough adjustment mechanism and second focus error detection system 3A are provided on the moving optical system 3. The rough adjustment mechanism vertically moves the lens unit 10 on the stage 11, thereby roughly adjusting the position of the objective lens relative to the primary optical disk 5. The light source of the second focus error detection system 3A is the long-wavelength laser 12. In the example shown in FIG. 1, the second focus error detection system 3A having the long-wavelength laser 12 as light source is also constructed on the basis of the astigmatic method. It should be noted that the feature of the second focus error detection system 3A, like the first focus error detection system 9, does not reside in the detection method. With respect to the second focus error detection system 3A with the long-wavelength laser provided on the moving optical system 3 and the first focus error detection system 9 for receiving the reflected recording beam from the primary optical disk and detecting the focus error, the optical constant of the first focus error detection system 9 which receives the reflected recording beam is set so that the first focus error detection system 3A may have the higher detection sensitivity. Thereby, the deterioration in reception light sensitivity of the photodetector to the recording beam is compensated, the SN ratio of the control system is increased, and the control precision is enhanced.

Figure 5:
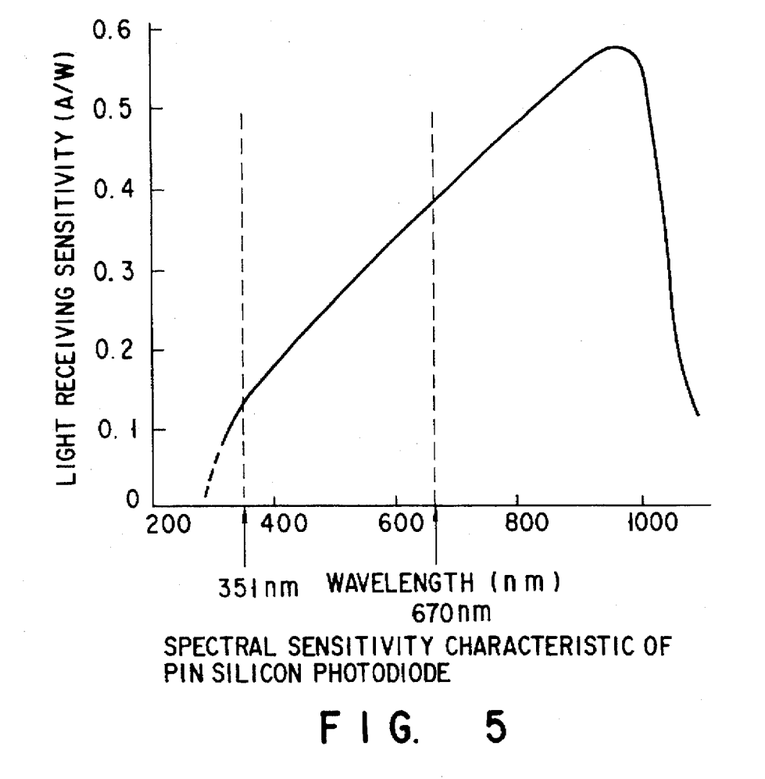
FIG. 5 is a graph showing a spectral sensitivity characteristic of a photodetector.
Figure 6:
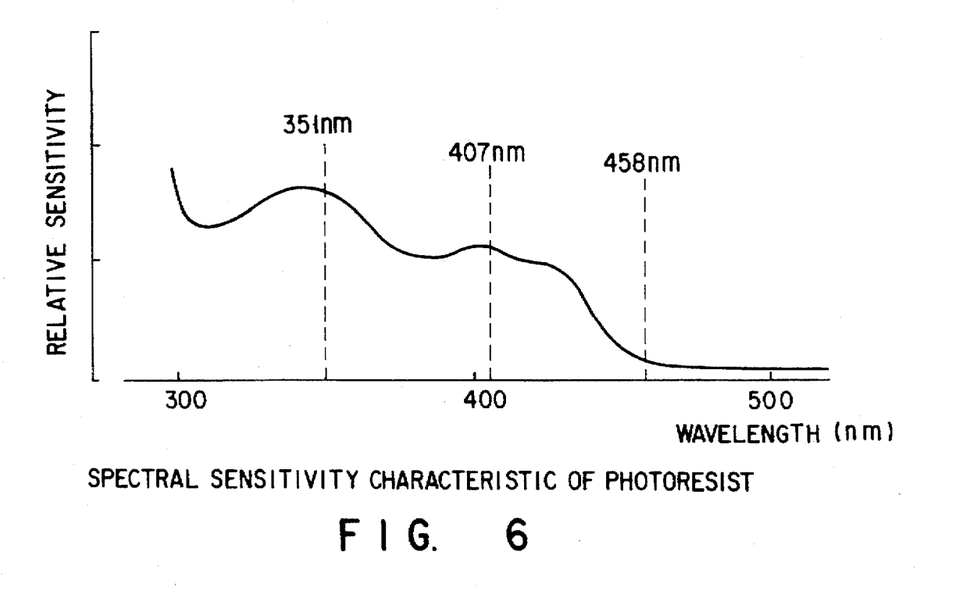
FIG. 6 is a graph showing a spectral sensitivity characteristic of a photoresist.

FIG. 5 shows a spectral sensitivity characteristic of PIN silicon photodiode which is used as a common photodetector. As compared to a He-Ne gas laser (633 nm) and a red semiconductor laser (670 nm) which are used when a separate light source is provided to detect a focus error, an ultraviolet laser (e.g. 351 nm) has a sensitivity three times lower. If the wavelength of the light source for information recording decreases in accordance with a decrease in sensitivity of the photodetector, the sensitivity of the photoresist of the recording medium increases. FIG. 6 shows an example of a spectral sensitivity characteristic of the photoresist. The light source for information recording for use in the primary optical disk recording apparatus has changed, for example, from an Ar ion laser (458 nm) to an Ar ion laser (407 nm) to a Kr ion laser (351 nm), in accordance with an increase in recording density. The sensitivity in the case of the Kr ion laser (351 nm) differs from that in the case of the Ar ion laser (458 nm) by about 9 times. Thus, a light output for radiating the primary optical disk decreases, and it is important to increase the detection sensitivity of the first focus error detection system 9 using the recording beam.

The conventional common structural features of the above-described primary optical disk recording apparatus, which do not directly relate to the subject matter of the invention, have been omitted. For example, a description has been omitted with respect to the structure for rotating the information recording beam incident on the dichroic mirror 15 by 90° about the optical axis of the beam, and the structure for converging the light beam and then converting the beam to a parallel beam via a pinhole in order to eliminate factors of influence on diffraction, e.g. the diameter of a light beam incident on the objective lens and contamination.

Before describing the method of controlling this primary optical disk recording apparatus, a description will now be given of the objective lens and the actuator for moving the objective lens along the optical axis.

Figure 2:
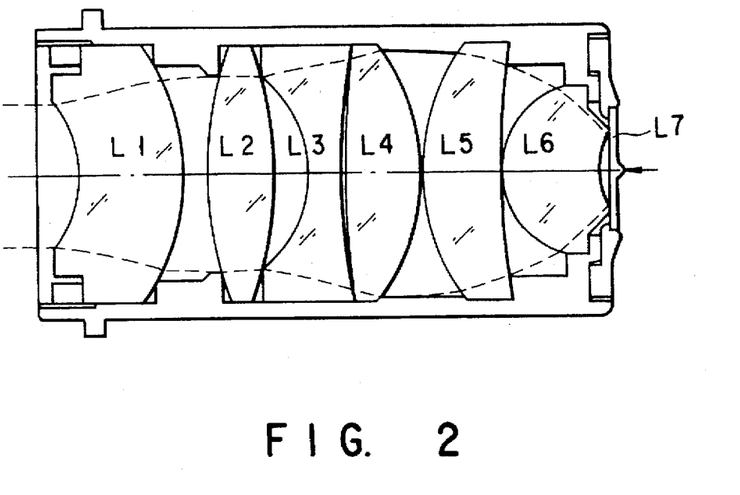
FIG. 2 shows an example of the structure of an objective lens used in the apparatus shown in FIG. 1.

FIG. 2 shows an example of the structure of a conventionally used objective lens, as described in "Objective Lens for Optical Recording of Wavelength 35/nm, NAU. 90", OPTICS, Vol. 23, No. 6 (June 1994). The objective lens comprises seven lenses L1 to L7 of a glass material having characteristics shown in FIG. 3. The lens L7 closest to the primary optical disk has a parallel plate shape. The objective lenses with many surfaces are subjected to surface treatment so as to prevent reflection of light having the wavelength of the information recording light source. It is difficult, however, to prevent reflection of light of other wavelengths, and thus reflection light occurs. Like the present invention, if the focus error is detected by using a light beam with a wavelength different from that of the recording light beam, the light beam reflected by the surfaces of the lenses of the objective lens becomes stray light.

If the stray light has incoherent influence on the focus error detection system and simply increases and decreases the amount of light, the influence on the focus error detection is not serious. However, if the stray light is coherent, some countermeasure must be provided to the stray light. In the case where the wavelength of the recording light source is that of visible light, such a problem does not actually occur since most of objective lenses are those used in microscopes which are processed to prevent light reflection at visible wavelength regions.

However, in the present state in which ultraviolet is used as light source, the objective lens is particularized and not processed to prevent reflection in a wide range of wavelengths. In the present invention, a low-coherence laser is used as a long-wavelength light source, thereby preventing coherence of stray light and making the stray light incoherent. Thus, the influence of the stray light on the detection system is reduced. The low-coherence laser is a self-oscillation semiconductor laser or a semiconductor laser driven with superimposed high frequency waves.

FIG. 4 schematically shows structural elements of the lens unit 10 comprising an objective lens 33 and an actuator 10A. The objective lens 33 is supported by upper and lower suspensions 34 and is vertically movable by the electromagnetic functions of a magnetic circuit including a permanent magnet 35 and of a coil 36. If the objective lens is moved in a direction perpendicular to the optical axis, the radial arrangement of pit lines of recorded information (i.e. a track pitch) is made irregular. When information is recorded on the primary optical disk of high recording density optical disks, the track pitch must be more precise. In the present invention, in order to curb the movement of the objective lens in directions other than the optical axial direction, the suspensions 34 are specially designed.

Figure 7A:
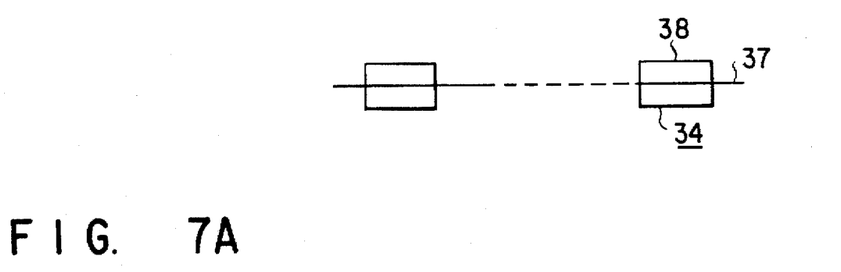
FIGS. 7A to 7C are cross-sectional views showing main parts of a suspension according to the embodiment of the invention.

The structure of the suspension of the present apparatus will now be described with reference to FIGS. 7A to 7C. In FIG. 7A, an outer peripheral portion and an inner peripheral portion of a plate spring 37 are connected by a spiral rim, and all region of the plate spring 37 between the outer peripheral and inner peripheral portions is sandwiched by viscoelastic members 38. The viscoelastic members 38 are formed of, e.g. rubber. With this structure, unnecessary vibration of the rim section can be curbed, and a response to vibration at a major resonance point of the plate spring is damped. Therefore, the actuator can be provided with good characteristics.

Furthermore, the actuator with good vibration characteristics can achieve the higher band operations of the control system, leading to higher control precision.

Figure 7B:
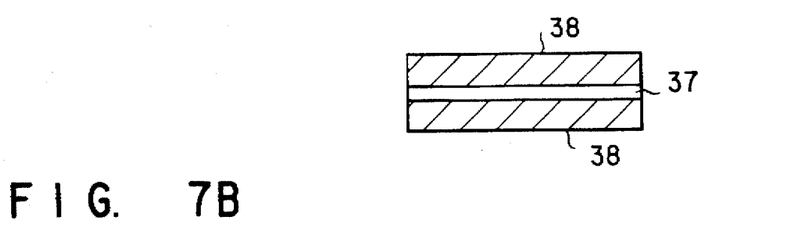
Figure 7C:
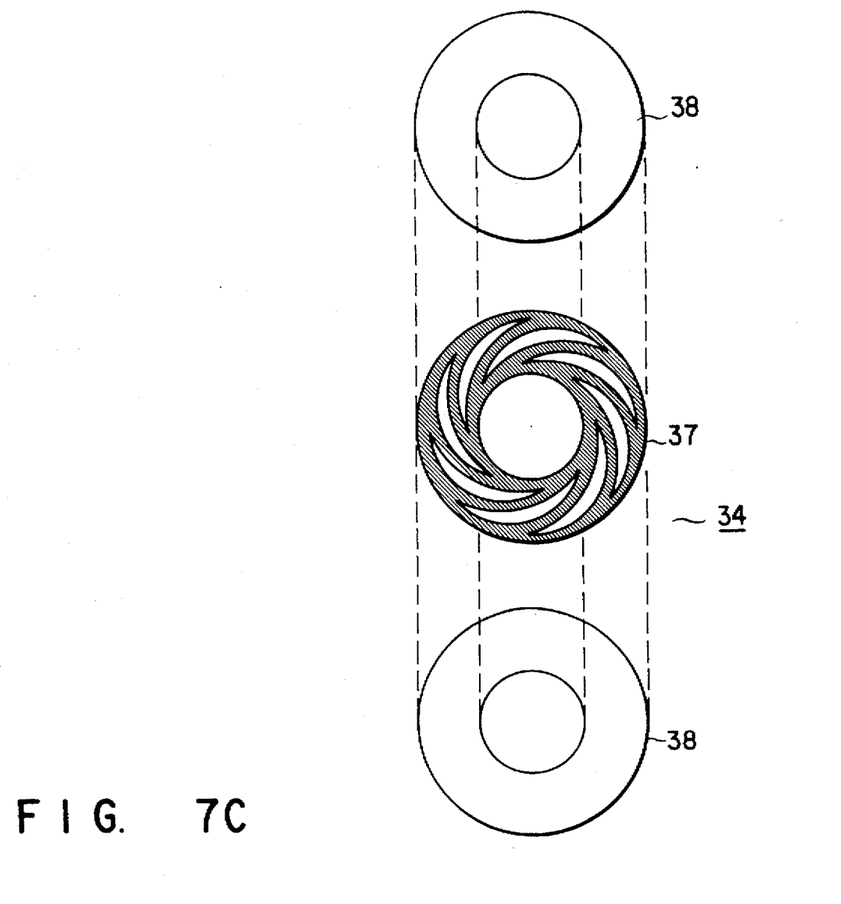

In FIGS. 7B and 7C, viscoelastic members 38 each having the same circular shape as a spirally punched plate spring 37 are attached to the upper and lower surfaces of the plate spring 37. The same advantages can be obtained with this structure.

The structure of the control system will now be described.

Figure 8:
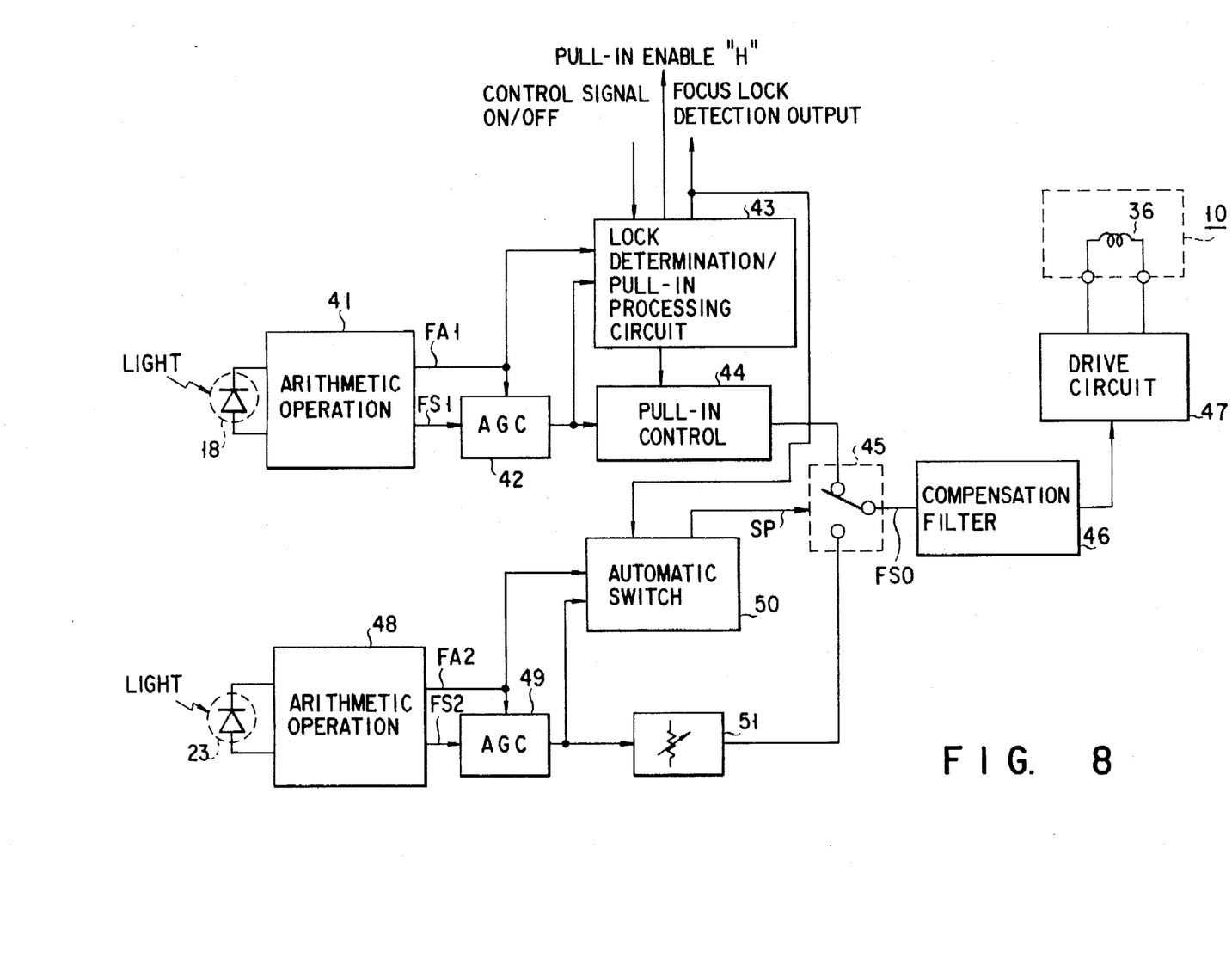
FIG. 8 is a block diagram showing a focus control system according to the embodiment of the invention.

FIG. 8 is a block diagram showing the structure of the focus control system. FIG. 8 does not show a control system for controlling a recording light beam for recording information on a primary optical disk. It is obvious, however, that if the recording light beam is radiated on the primary optical disk 5, a reflection beam from the disk 5 is made incident on the photodetector 23.

Figure 9A:
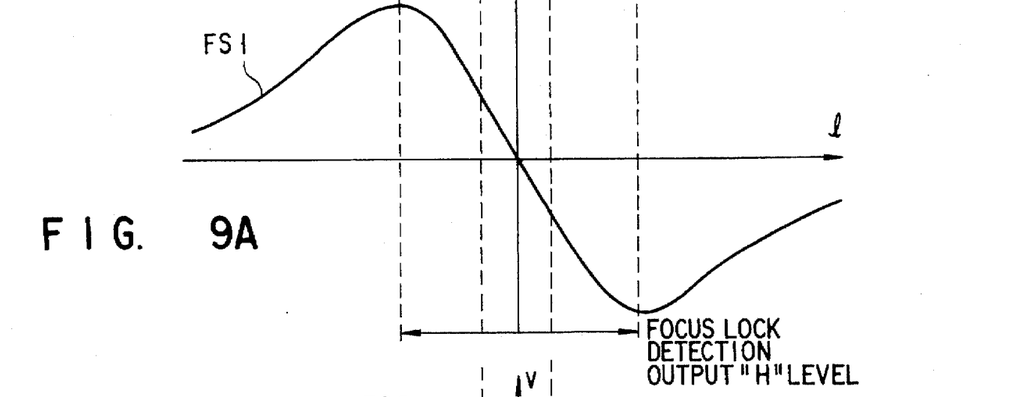
FIGS. 9A to 9E schematically show signals flowing in a focus detection system according to the embodiment of the invention.

The operation of the focus control system will now be described with reference to FIGS. 8, 9A to 9E and 10 according to the procedure of the operation of the primary optical disk recording apparatus. The primary optical disk 5 is set on the turntable 7 (Time a in FIG. 10). The lens unit 10, which is situated above the stage 11 when the primary optical disk has been set, gradually approaches the primary optical disk 5 (Time b and Time c in FIG. 10). Then, the light beam emitted from the laser 12 and reflected by the primary optical disk 5 is received by the photodetector 18. The actual photodetector 18 has a plurality of light receiving surfaces. An output from the photodetector 18 with the light receiving surfaces is supplied to an arithmetic operation unit 41. The arithmetic operation unit 41 outputs a difference signal FS1 and a sum signal FA1 of a focus error signal. FIG. 9A shows the difference signal FS1. The horizontal axis indicates a distance between the lens unit 10 and primary optical disk 5. The detection system is adjusted such that the output of "zero" corresponds to the focus position of the recording beam. When the lens unit 10 has reached the region indicated by the "H level" of the focus lock detection output in FIG. 9A, i.e. the pull-in enable region (Time d in FIG. 10), the movement of the lens unit 10 itself is stopped (Time d in FIG. 10). The determination of these states is performed by a lock determination/pull-in processing circuit 43 shown in FIG. 8. The determination output signal is sent to a system controller which controls the entire primary optical disk recording apparatus. Upon receiving the determination output signal, the system controller outputs a control command signal "ON" to the lock determination/pull-in processing circuit 43. Upon receiving this control command signal, the lock determination/pull-in processing circuit 43 instructs a pull-in control circuit 44 to output the difference signal FS1 which has passed through an AGC circuit 42. Then, a current corresponding to the difference signal FS1 flows to a coil 36 via a switch 45, a compensation filter 46 and a drive circuit 47, thereby controlling the position of the objective lens (Time d and Time e in FIG. 10). Subsequently, the recording operation is started (Time e in FIG. 10).

If the focus lock detection output is "H level" while the control operation is being performed by the difference signal FS1, the objective lens is set in such a position that the difference signal FS1 is at zero level.

By the above control, the primary optical disk is substantially set in the focal position of the recording beam. However, owing to a chromatic aberration of the objective lens (i.e. a difference in focal distance due to wavelength), the control signal detected at a wavelength different from the wavelength of the recording beam includes an error due to an influence of the thickness or warp of the primary optical disk.

By contrast, in the present invention, when the actual recording operation is started, the recording beam reflected by the primary optical disk is received by the photodetector 23 and the control based on the control signal obtained from the photodetector 23 is started. This operation will now be described with reference to FIGS. 8, 9A to 9E and 10.

Figure 9B:
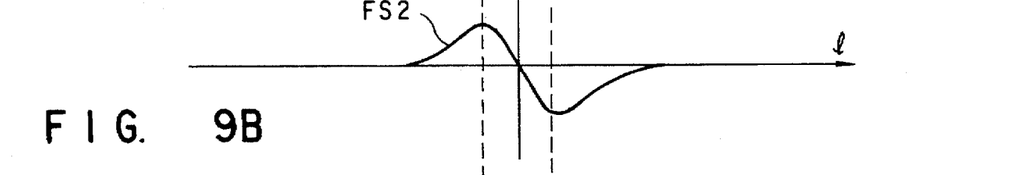
Figure 9C:
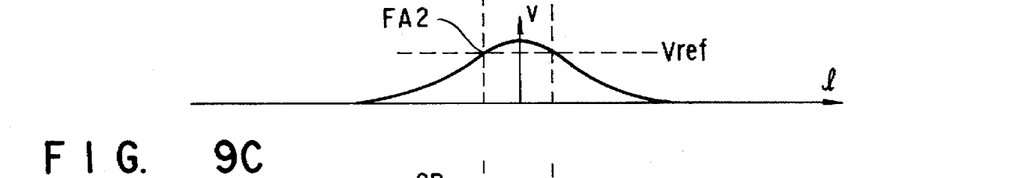
Figure 9D:
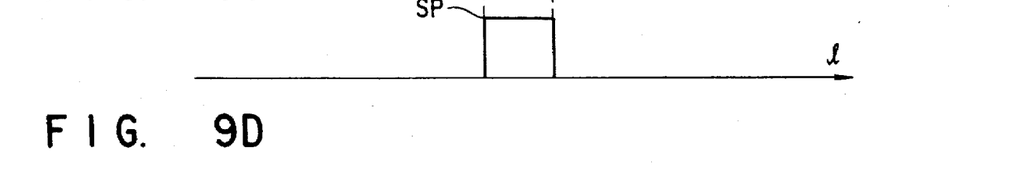
Figure 9E:
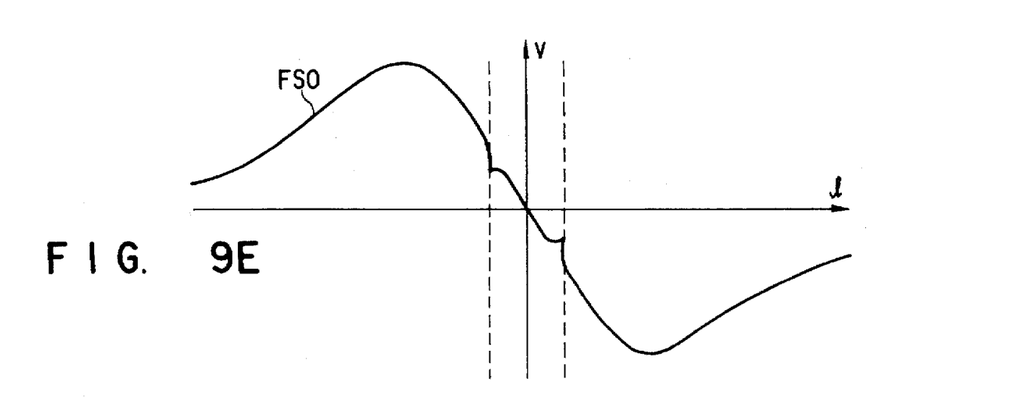
Figures 10A, 10B:
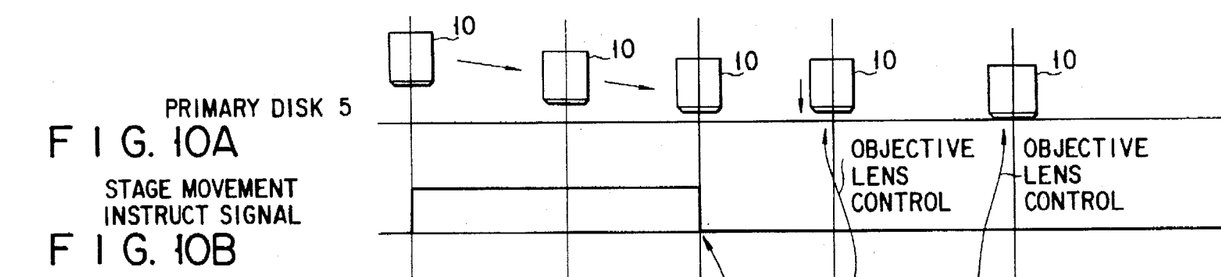
FIG. 10 is a timing chart illustrating the switching between a first focus detection system and a second focus detection system.
Figure 10C:
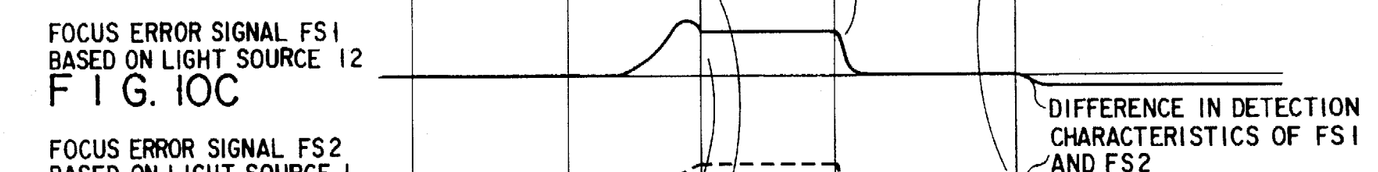
Figures 10D, 10E:
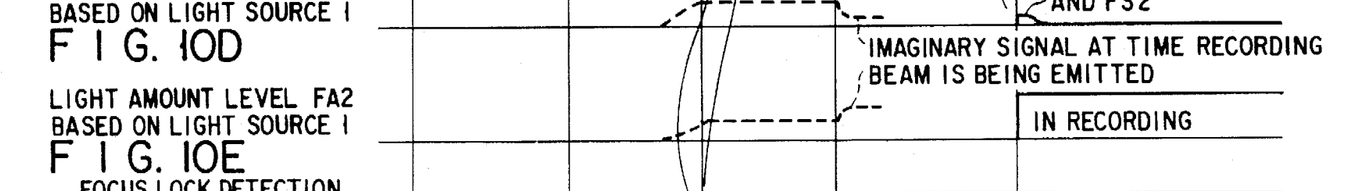
Figures 10F, 10G:
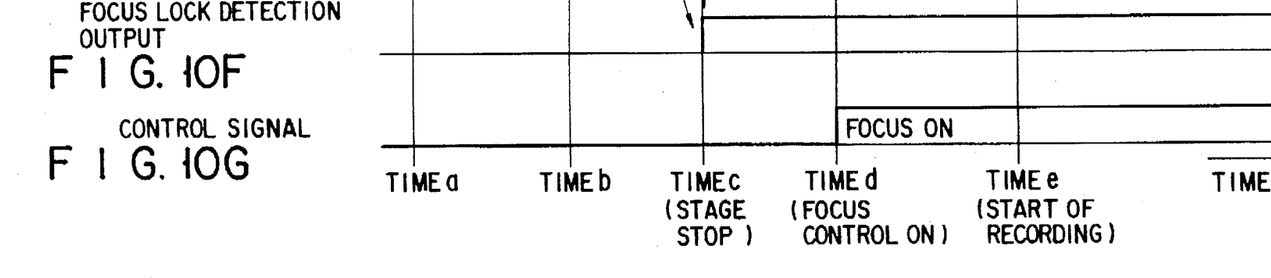

Like the photodetector 18, the photodetector 23 has a plurality of light receiving surfaces. An output from the photodetector 23 with the light receiving surfaces is fed to an arithmetic operation unit 48. The arithmetic operation unit 48 outputs a difference signal FS2 and a sum signal FA2 of a focus difference signal. FIG. 9B shows the difference signal FS2, and FIG. 9C shows the sum signal FA2. The horizontal axis indicates a distance between the objective lens 33 and primary optical disk 5. The detection system is adjusted such that the output FS2 of "zero" corresponds to the focus position of the recording beam. The difference signal FS2 is input to an automatic switching circuit 50 via an AGC circuit 49, along with the sum signal FA2. The automatic switching circuit 50 determines whether the output level of the sum signal FA2 has a predetermined value (vref) or more, and outputs a switch signal SP, as shown in FIG. 9D, for operating the switch 45. When the switch 45 is connected to a lower terminal (in FIG. 8), the difference signal FS2 from a gain adjusting circuit 51 is supplied to the focus control system as a control signal. Specifically, the control signal is switched to the signal produced by the beam for recording information on the primary optical disk. Like the case of the control signal FS1, the position of the objective lens 33 relative to the primary optical disk 5 is controlled by the difference signal FS2. The control system constructed as shown in FIG. 8 is controlled by a composite control signal FSO (FIG. 9E) of the difference signals FS1 and FS2.

Figure 11:
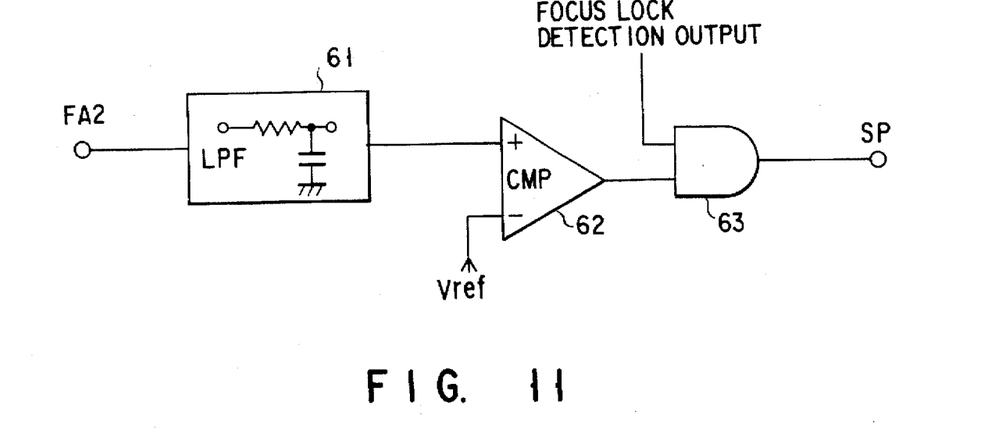
FIG. 11 is a block diagram showing a focus control signal switching section according to the embodiment of the invention.
Figure 12:
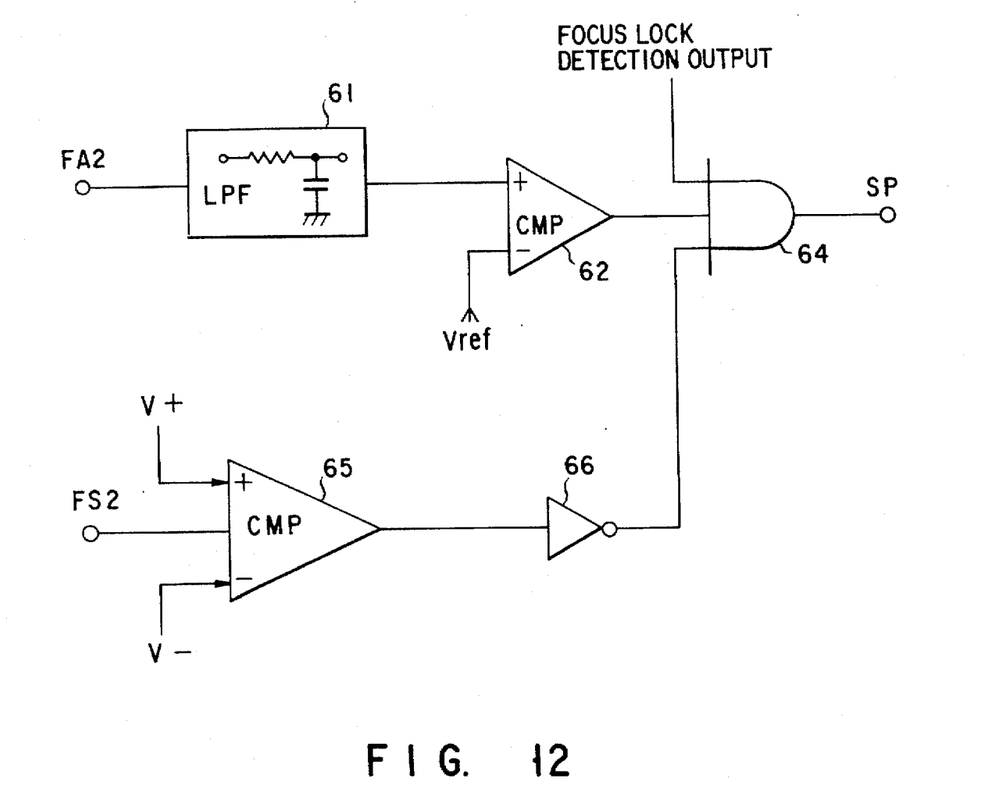
FIG. 12 is a block diagram showing another focus control signal switching section according to the embodiment of the invention.

FIGS. 11 and 12 show switching signal generating circuits for automatically switching the control signal. In FIG. 11, a switching signal is generated by using the sum signal FA2. The sum signal FA2 is input to a comparator 62 via a filter 61 (in general, a low-pass filter). The filter 61 has the same frequency characteristics as the vibration characteristics of the actuator for moving the objective lens, thereby to stabilize the operation after switching. The comparator 62 compares the signal FA2 with a reference voltage Vref having a predetermined level. If the sum signal FA2 input via the filter 61 is greater than the reference voltage Vref, an H-level signal is output. When the H-level signal is output from the comparator 62 and a focus lock detection output representing the control based on the signal FA1 is at H level, a control switching signal SP is at H level. These signals are illustrated in FIGS. 9C and 9D.

FIG. 12 shows an example in which a switching signal for achieving more exact switching is generated. When the output condition of the control switching signal SP shown in FIG. 11 is met and the difference signal FS2 is in the range between V+ and Vl, the control signal is switched to the difference signal FS2.

Next, an optical disk exposure apparatus will be described. In this apparatus, a focus error detection optical system is attached to a unit for driving the objective lens, thereby to improve a focus offset due to a variance in thickness of the primary optical disk and to always ensure just focus. In addition, a rough focusing operation is switched to a fine focusing operation, thereby to more precisely control the distance between the objective lens and the primary optical disk. Therefore, the distance can be set within the focal depth and a uniform optical disk with a small variation in beam diameter can be produced.

Figure 13:
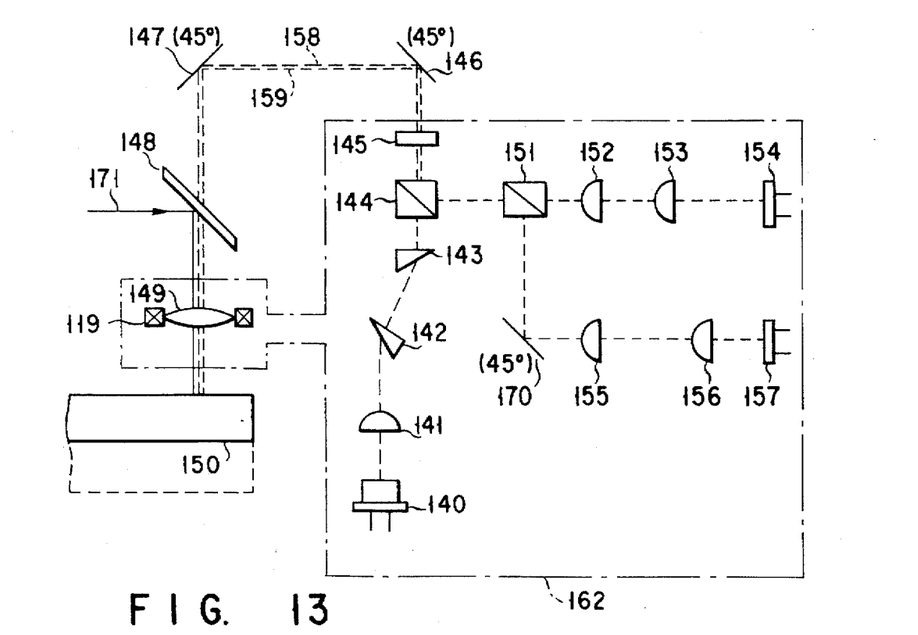
FIG. 13 shows a focus error detection optical system according to another embodiment of the invention.

FIG. 13 shows, in particular, a focus error detection optical system 162 of the primary optical disk exposure apparatus. The optical system will now be described with reference to FIG. 13. A laser beam is emitted from an LD (semiconductor laser diode) 140. The emitted laser beam is a diffused light beam. The diffused light beam is converted to a parallel beam through a collimate lens 141. The aspect ratio of the parallel beam is not 1:1, but the beam has an oval cross section. The beam is shaped to have a substantially circular cross section by shaping prisms 142 and 143. The shaped light beam passes through a polarizing beam splitter 144. A P-polarized component of the beam can pass through the polarizing beam splitter 144 and an S-polarized component is reflected. The P-polarized component, which has passed through the polarizing beam splitter 144, passes through a λ/4 wavelength plate 145 to have an oval cross section. The beam with the oval cross section is reflected by mirrors 146 and 147 and passed through a dichroic mirror 148. Thus, the beam is made incident on an objective lens 149 on the other hand, a recording beam 171 modulated in accordance with a recording signal in an optical system, as shown in FIG. 13, is reflected by the dichroic mirror 148 and guided to a primary optical disk 150 via the objective lens 149. The objective lens 149 is controlled by the actuator 119 on the basis of focus error signals from photodetectors 154 and 157 (described later) so that the recording beam 171 can be focused on the rotating primary optical disk 150. The recording beam 171 is spirally radiated on the disk 150 from the inner peripheral portion thereof. The objective lens 149 and actuator 119 are connected to a lens holder 162 including a focus error detection system. The dichroic mirror 148 has such wavelength selectivity as to reflect most of the recording beam 171 and to pass the beam from the semiconductor laser 140. The incident beam is reflected by the primary optical disk 150 and the beam from the semiconductor laser alone is passed through the dichroic mirror 148 and sent back to the mirrors 146 and 147 along the same path as the light incidence path. The circularly-polarized beam is converted to an S-polarized beam by the λ/4 wavelength plate 145. This beam is reflected by the polarizing beam splitter 144 and the light path of the beam is deflected over 90°. The deflected beam is guided to two detection systems via a non-polarizing beam splitter 151. In one of the detection systems, the beam is deflected over 90° by a mirror 170 and sent to the detector. The detection systems comprise convex lenses 152 and 155, cylindrical lenses 153 and 156 and photodetectors 154 and 157. Focus errors are detected by an astigmatic method.

The two detection systems may be arranged in horizontal and vertical directions, by omitting the mirror 170.

Figure 14:
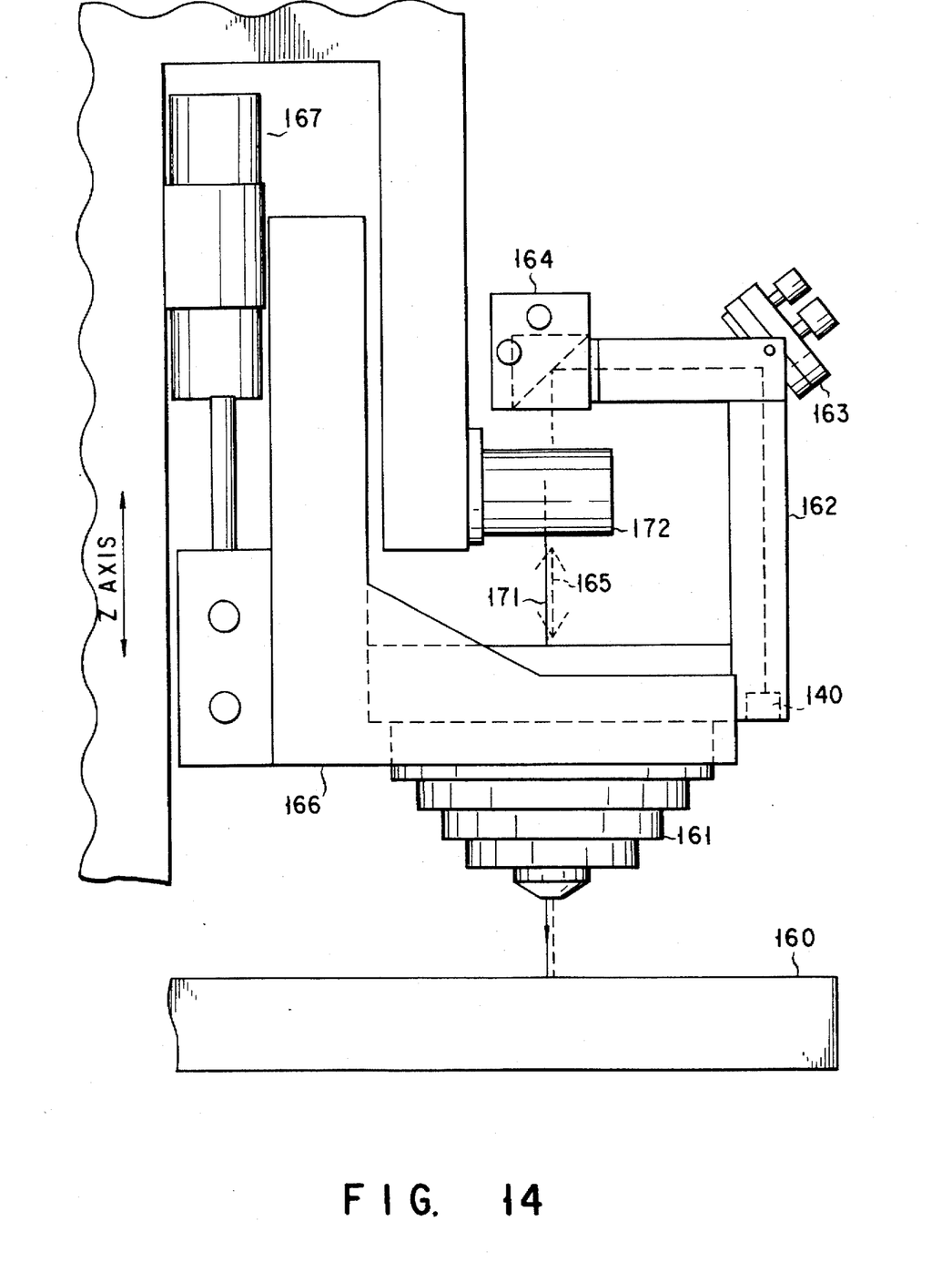
FIG. 14 shows the state in which the focus error detection optical system according to said another embodiment of the invention is attached.

FIG. 14 shows the optical disk exposure apparatus, as viewed from the lens holder 162. The error detection optical system as the lens holder 162 having the semiconductor laser 140 for focus control and finely movable mirrors 163 and 164 are attached to a motor-driven Z-axis stage 166 to which an objective lens 161 is attached. The finely movable mirrors 163 and 164 are provided with mirrors for controlling the laser beam so that the laser beam from the laser 140 may be radiated on a predetermined position on the primary optical disk 160 via the objective lens 161. The laser beam can be controlled by the mirrors 163 and 164 so as to enter the objective lens 161 in parallel. Since the error detection optical system shown in FIG. 13 is built in the lens holder 162, the optical path length is constant even if the thickness of the primary optical disk 160 is varied. In addition, the just-focus position is not displaced even in the primary optical disk exposure apparatus of the present invention in which a converged beam is made incident.

Figure 15A:
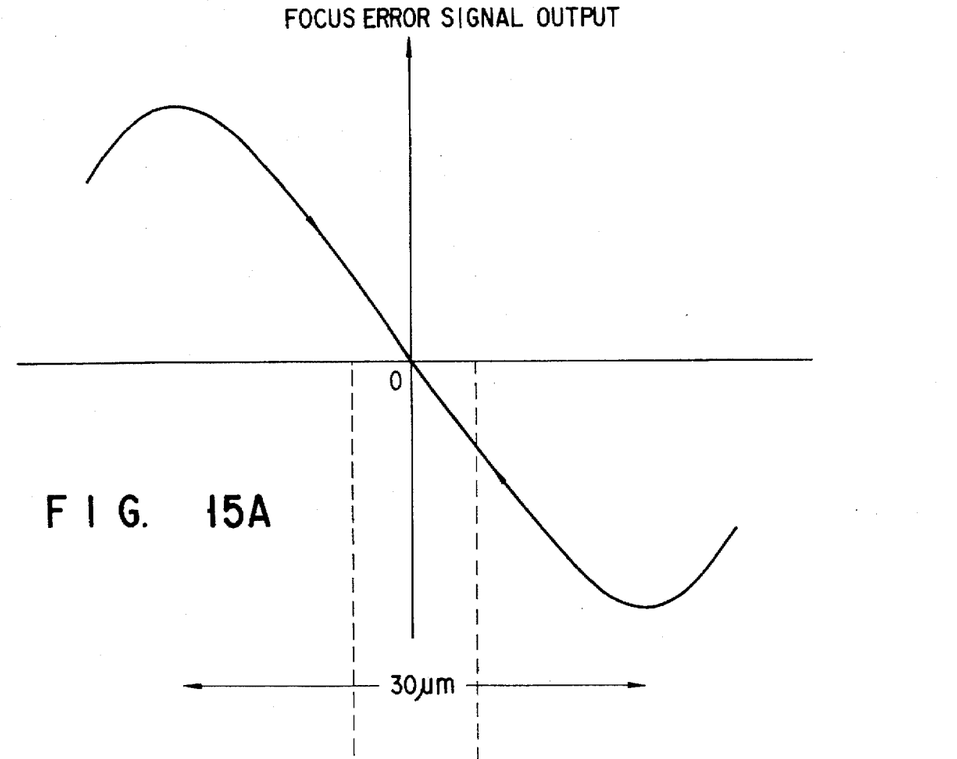
FIGS. 15A and 15B are graphs showing characteristics of a photodetector used in a primary optical disk recording apparatus according to said another embodiment of the invention.
Figure 15B:
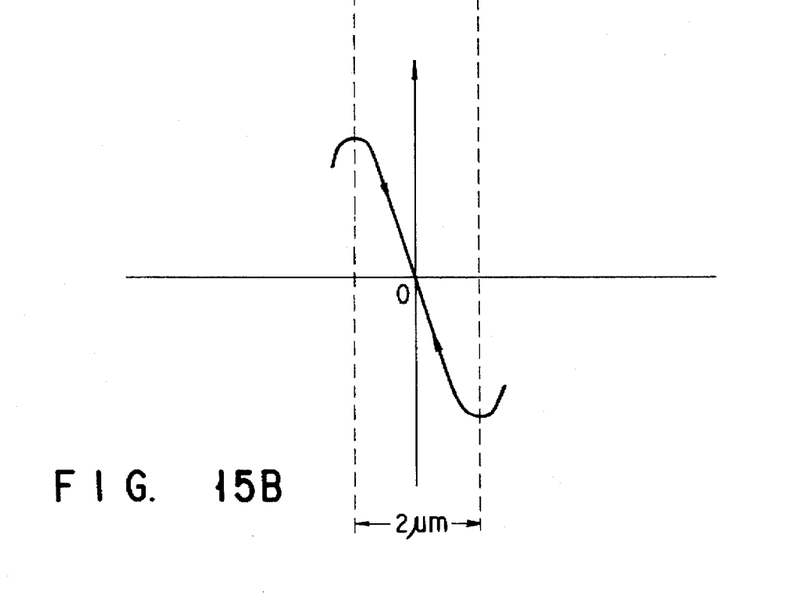

The motor-driven Z-axis stage 166 with the objective lens 161 can be moved along the Z-axis by a motor 167. In the focus control operation, the Z-axis stage 166 driven by the motor 167 and provided with the objective lens 161 is at first lowered towards the primary optical disk 160. When the distance between the objective lens 161 and primary optical disk 160 is set at a predetermined value, the beam from the semiconductor laser 140 of the focus error detection system is reflected from the primary optical disk 160 and guided to the photodetectors 154 and 157 as return beams. As is shown in FIGS. 15A and 15B, the focus pull-in detection range of the photodetector 154 is 30 μm (FIG. 15A) and is less than that of the photodetector 157 which is 2 μm (FIG. 15B). At first, the focus detection system of the photodetector 154 having the wider focus pull-in detection range is used to perform focus pull-in. Then, using the photodetector 157 with the narrower detection range, the finer focusing is performed. At the time the fine focusing has been effected by the photodetector 157, the recording beam 171 is radiated on the primary optical disk 150 to perform information recording. In FIG. 14, the recording beam 171 is incident on the dichroic mirror 148 of an adapter 172. The dichroic mirror 148 is attached to the adapter 172 in a direction from the reverse side to the obverse side of the sheet of the figure.

As has been described above, the present invention has the following advantages:

1. Since the recording beam itself is used for focus control during the recording time period, the focus control precision is improved. In addition, since the focus error detection system is constructed such that a low-coherence semiconductor laser is used as light source for prefocusing prior to the start of recording and coherence of stray beams due to the objective lens is prevented, the precision of prefocusing has been improved. Specifically, since the light beam for information recording is used to perform focus control, the aberration of the objective lens is small and the focus error can be detected with high precision. Besides, since the light beam for information recording is used only during the recording time, the light output is large, resulting in higher precision in detection. In the time period excluding the recording time, the recording beam is not radiated on the primary optical disk. In this time period, like the prior art, a long-wavelength light source is provided and a reflection beam of the beam from the light source, which is reflected by the primary optical disk, is detected to carry out focus control. Thus, information can be exactly recorded from the beginning of the recording.

2. In the beam monitor system provided for monitoring abnormality during recording, an aberration is applied to the reflection beam to exactly determine a variation in beam shape due to a slight focus error. Thus, the determination precision of the observation system is improved. Specifically, since the shape of beam varies due to a slight focus error, a focus error can be easily monitored. Furthermore, a constant focus error, which cannot be determined in the prior art if the control is stable, can easily be determined since the shape of beam differs from the shape in the in-focus state.

3. The actuator of the objective lens to be controlled is designed to curb unnecessary vibration. Thus, the recording precision of the primary optical disk recording apparatus can be totally improved. Specifically, since the inner and outer peripheral portions of the suspension are coupled by the spiral rim, a long distance can be kept for the movement of the objective lens along the optical axis. In addition, since the entire surfaces of the suspension are sandwiched by viscoelastic members, unnecessary vibration of the rim can be remarkably suppressed and the control band of the focus control can be increased. Therefore, the control precision is enhanced and the information can be more effectively recorded on the high-density primary optical disk.

4. Since the focus error detection optical system is attached to the objective lens driving unit, the photoresist portion is just focused even if the thickness of the substrate varies. There is no need to perform fine adjustment and the problem due to a variance among primary optical disks is solved. Besides, the rough focusing can be switched to the fine focusing, thereby to control more precisely the distance between the objective lens and the primary optical disk. Thus, the distance can be set within the focal depth and the variation in beam diameter is reduced. Therefore, an optical disk exposure apparatus capable of producing a uniform optical disk can be provided.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An apparatus for recording information on a primary optical disk adapted to manufacture optical disks, said apparatus comprising:

a first light source for emitting a light beam;

an objective lens for converging said light beam from said first light source on said primary optical disk;

a second light source for emitting a light beam;

first detection means for detecting a first reflection light beam from the first light source which is reflected from the primary optical disk while the information is being recorded on the primary optical disk, and for subjecting a signal of the first reflection light beam to an arithmetic operation process, thereby detecting a first focus error signal;

second detection means for detecting a second reflection light beam from the second light source which is reflected from the primary optical disk while the information is not being recorded on the primary optical disk, and for subjecting a signal of the second reflection light beam to an arithmetic operation process, thereby detecting a second focus error signal;

means for selecting one of a first state and a second state in accordance with the first focus error signal and the second focus error signal, first control means for controlling a focus error between said objective lens and said primary optical disk on a basis of the first focus error signal detected by said first detection means when the first state is selected by the selection means; and second control means for controlling said focus error on a basis of the second focus error signal detected by said second detection means when the second state is selected by the selection means.

2. The apparatus according to claim 1, wherein at least one of said first light source and said first detection means, on the one hand, and said second light source and said second detection means, on the other hand, are arranged on a member for driving said objective lens.

3. The apparatus according to claim 1, wherein said second light source comprises a laser light source for emitting a light beam larger in wavelength than said light beam from said first light source.

4. The apparatus according to claim 1, further comprising an optical system for making a focus error detection range of the first focus error signal narrower than a focus error detection range of the second focus error signal.

5. The apparatus according to claim 1, further comprising determination means for automatically determining a switching between said first focus error signal and said second focus error signal for controlling said focus error, on the basis of said first focus error signal.

6. The apparatus according to claim 1, further comprising a beam monitor system for proving an aberration to the first reflection light beam, and monitoring a variation in beam shape of the first reflection light beam provided with said aberration, thereby to observe the focus error.

7. The apparatus according to claim 6, wherein said beam monitor system includes means for providing an astigmatism to the first reflection light beam.

8. The apparatus according to claim 6, wherein said beam monitor system includes means for providing a mixed aberration to the first reflection light beam.

9. The apparatus according to claim 1, further comprising:

an actuator for moving said objective lens along an optical axis so as to cancel the focus error; and a suspension, formed by sandwiching a plate spring by viscoelastic members, for supporting said objective lens movable along the optical axis.

10. The apparatus according to claim 9, wherein said viscoelastic members comprise rubber.

11. The apparatus according to claim 1, wherein said second light source and said second detection means are arranged on a member for driving said objective lens.

12. An apparatus for recording information on a primary optical disk adapted to manufacture optical disks, said apparatus comprising:

a first light source for emitting a light beam;

an objective lens for converging a light beam from said first light source on said primary optical disk;

a second light source for emitting a light beam;

focus error detecting means for detecting a first focus error signal between said objective lens and said primary optical disk on the basis of said light beam from said second light source;

a member for driving said objective lens; and a controller, provided on said member, for detecting a reflection light beam from said first light source, which has been reflected from said primary optical disk, while said information is being recorded on said primary optical disk, detecting a second focus error signal by subjecting a signal of said reflection light beam to an arithmetic operation process, and controlling a focus error between said objective lens and said primary optical disk on a basis of said first and said second focus error signals.

13. The apparatus according to claim 12, wherein said focus error detecting means comprises an optical system for making a focus error detection range of the first focus error signal narrower than a focus error detection range of the second focus error signal.

14. The apparatus according to claim 12, wherein said controller comprises an optical system for making the focus error detection range of the first focus error signal narrower than the focus error detection range of the second focus error signal.

* * * * *